United States Patent
Fables et al.

(10) Patent No.: US 6,895,406 B2
(45) Date of Patent: May 17, 2005

(54) DYNAMIC PERSONALIZATION METHOD OF CREATING PERSONALIZED USER PROFILES FOR SEARCHING A DATABASE OF INFORMATION

(75) Inventors: Wylci Fables, Kula, HI (US); Jore Park, Kula, HI (US); Jonathan Colt, Makawao, HI (US)

(73) Assignee: SeaSeer R&D, LLC, Kula, HI (US)

( * ) Notice: Subject to any disclaimer, the term of this patent is extended or adjusted under 35 U.S.C. 154(b) by 441 days.

(21) Appl. No.: 09/939,278

(22) Filed: Aug. 23, 2001

(65) Prior Publication Data

US 2002/0024532 A1 Feb. 28, 2002

Related U.S. Application Data

(60) Provisional application No. 60/228,154, filed on Aug. 25, 2000.

(51) Int. Cl.[7] .............................................. G06F 17/30
(52) U.S. Cl. .............................. 707/102; 707/5; 707/6; 707/10
(58) Field of Search ................. 707/1–7, 10, 100–104.1

(56) References Cited

U.S. PATENT DOCUMENTS

| | | | |
|---|---|---|---|
| 5,758,328 A * | 5/1998 | Giovannoli | 705/26 |
| 5,890,152 A | 3/1999 | Rapaport | |
| 5,931,907 A | 8/1999 | Davies | |
| 6,085,229 A | 7/2000 | Newman | |
| 6,189,002 B1 | 2/2001 | Roitblat | |
| 6,199,067 B1 | 3/2001 | Geller | |
| 6,236,978 B1 | 5/2001 | Tuzhilin | |
| 6,256,633 B1 | 7/2001 | Dharap | |
| 6,363,377 B1 * | 3/2002 | Kravets et al. | 707/4 |
| 6,460,036 B1 * | 10/2002 | Herz | 707/10 |
| 6,489,968 B1 * | 12/2002 | Ortega et al. | 345/713 |
| 6,513,036 B2 * | 1/2003 | Fruensgaard et al. | 707/4 |
| 6,564,210 B1 * | 5/2003 | Korda et al. | 707/3 |
| 6,631,372 B1 * | 10/2003 | Graham | 707/5 |

* cited by examiner

Primary Examiner—Debbie M. Le
Assistant Examiner—Greta Robinson
(74) Attorney, Agent, or Firm—Leighton K. Chong; Ostrager Chong Flaherty & Broitman

(57) ABSTRACT

A method for creating a personal profile of a user for searching a database comprises the following steps: (a) words or words linked to graphical elements are presented as choices to a user in a display; (b) each word is associated with other keywords or default words; (c) if a profile of the user has previously been established, the profile is referenced for previous added keywords or associative words; (d) search phrases are made from selected keywords or associative words added to the profile; (e) the search phrases are sent as search queries to search for objects in the database; (f) the objects returned from the search are presented to the user as a new display of choices; (g) when a user selects an object, the words that were used to search for that object are added to the user's profile, or reinforced if already present; and the steps (d) to (g) above are repeated iteratively. The user profiling method is preferably employed with a standard browser while the user visits websites or portals on the Internet which are structured with site word maps to implement the keyword references. The user profile can then be used to identify the user's preferences for items of interest on websites visited by the user.

13 Claims, 2 Drawing Sheets

Figure 2

| Click | Search Result | Search Phrase |
|---|---|---|
| clicked | a | 1,2 |

Map
1[1],2[1]
2[1],1[1]

| Click | Search Result | Search Phrase |
|---|---|---|
| clicked | b | 3,4 |

Map

1[1],2[1]
2[1],1[1]
3[1],4[1]
4[1],3[1]

| Click | Search Result | Search Phrase |
|---|---|---|
| clicked | c | 1,4 |

Map

1[2],2[1],4[1]
2[1],1[1]
3[1],4[1]
4[2],3[1],1[1]

| Click | Search Result | Search Phrase |
|---|---|---|
| clicked | c | 1,2 |

Map

1[3],2[2],4[1]
2[2],1[2]
3[1],4[1]
4[2],3[1],1[1]

| Click | Search Result | Search Phrase |
|---|---|---|
| clicked | c | 1,3 |

Map
1[4],2[2],4[1],3[1]
2[2],1[2]
3[2],4[1],1[1]
4[2],3[1],1[1]

DYNAMIC PERSONALIZATION METHOD OF CREATING PERSONALIZED USER PROFILES FOR SEARCHING A DATABASE OF INFORMATION

This U.S. patent application claims the priority filing date of U.S. Provisional Application No. 60/228,154 filed on Aug. 25, 2000 by the same inventors, entitled "Dynamic Personalization System & Method".

TECHNICAL FIELD

The invention pertains to improving the function of searching for items of interest to a user contained in a large or distributed database of information in a networked computing environment, such as the Internet. In a typical environment, an end user uses a browser to search the World Wide Web for items of interest stored in databases maintained at websites on the Internet. The invention seeks to improve the results of a user's queries to a database such that each response is increasingly tailored to be of interest to the particular individual user as an extremely fine-grained personalized response, rather than a generalized or generic response or even a personalized response generated by coarse user profiling methods.

BACKGROUND OF THE INVENTION

In common use on the World Wide Web today are software applications used to accomplish personalization of website database responses to an individual. The methods in common usages generally fall in to one of two broad categories. One main category is personalization via the applying of prescribed rules to an automated database response selection process. In these applications, the database responds in accordance with rules that were created in advance, so that when a request or series of requests are identified by the prescribed rules to be of a certain type, the database response is constrained or filtered to that type of request. The second main category is personalization of a response generated by analysis of the history of the user's visits on the Internet when performing database requests in the past. These applications are usually based upon performing collaborative filtering based upon past user history, usually gathered from an amalgam of sources of user information. Some software applications use both of these general methods in whole or in part. Many of these types of personalization methods use demographic designations to determine the response, giving a very coarse response based upon general statistics rather than personal information.

SUMMARY OF THE INVENTION

The present invention provides a method of creating personalized user profiles to improve the targeting of a user query to a database and the selectivity of the response from the database, without reliance on the coarser, conventional structured query or profiling methods. In accordance with the present invention, a method of creating a personalized user profile implemented on a computer for searching a database comprises:

(a) Displaying to the user an index of choices representing content items stored in the database, wherein each choice of the index is associated with a set of related keywords representing categories for the content items stored in the database;

(b) Establishing a personal profile for the user comprising keywords compiled from selections made by the user from the displayed index and entered as user input on the computer;

(c) Receiving a first user input of a selection of a choice from the displayed index, and retrieving the associated keywords related to the selected choice in order to generate a set of search phrases using the associated keywords;

(d) Conducting a search of the database using the set of search phrases as search queries to the database, and returning one or more objects from the database in response to the search queries;

(e) Displaying to the user a new index of choices representing the objects returned from the database, wherein each choice on the displayed index is associated with the keywords used in the search phrase that returned the object represented;

(f) Receiving a subsequent user input of a selection of a choice from the displayed index, and updating the user's personal profile with the keywords used in the search phrase that returned the selected object;

(g) Retrieving associated keywords related to the keywords used in the search phrase that returned the selected object in order to generate a subsequent set of search phrases using the associated keywords;

(h) Conducting a subsequent search of the database using the subsequent set of search phrases as further search queries to the database, and returning one or more objects from the database in response to the search queries;

(i) Displaying to the user a new index of choices representing the objects returned from the database, wherein each choice on the displayed index is associated with the keywords used in the search phrase that returned the object represented; and (j) Iteratively continuing the cycle of user input by selection from the displayed index of choices, updating the user's personal profile with keywords used in the search phrase that returned the object selected by the user, using associated keywords related to the selected keywords to generate a subsequent set of search phrases, and conducting a further search of the database with the subsequent set of search phrases, thereby enhancing the depth of the personal profile and allowing it to be used to uniquely characterize the particular interests of the user in computerized applications that are to be personalized to the user.

In the preferred embodiment, the invention method is implemented using keywords or display objects linked to keywords for selections as user input cues, a network environment as the repository of a large or distributed database of information, and a standard browser as the interface between the user connected on a computer to the network environment. The invention pays attention to the unique outcome occurring as a result of each request/response cycle made by a user in each session of computer use, and stores keywords representing selections made by the user in a personal word map for the user's profile. To initiate a session by the user, a previous personalized word map stored on the computer is retrieved, or, if there is no stored personal word map, a default (initial) word map is used. The user profiling method of the invention is implemented as a software application that functions as an "affinity engine", defined here as a content aware correlation engine, which performs the task of contextual cognition of natural language syntax driven by user inputs. The user inputs are used to dynamically generate control cues, which in turn are utilized to organize or influence the delivery of text, numeric, audio, graphical, and data objects, processes, or media entities being provided or transacted in a web portal or interactive media system.

The affinity engine utilizes the natural language associated with database-stored content, including natural language elements stored as metadata to establish proximities of inferred thematic content. Output control drivers are executed to dynamically formulate a response from the database that delivers the content to the user in successive orders of associative proximity. At the same time, a specifically user unique and constantly updated user profile data set is created.

The invention method operates on an interative basis to construct a personal profile of the user in relation to available content, while continuously refining the intuitive coupling between user response and content delivery. The associative proximity assessment process improves over repeated iterations of user responses, and thus captures the nuances and subtleties specific to a user's particular history of responses.

Unlike traditional search engines, which require direct human input of specific keywords, phrases, or other cueing elements by which a search process is invoked, the invention method allows the user to make selections from displayed choices and acts to enhance the user's profile and generate new choices based on the user's responses. The conventional search engines utilize standard text queries entered by the user, rules-based inference, or Boolean logic combining words into phrases which are predetermined and uniformly applied for all users, and do not perform further evaluation of choices made by the individual user or compile cumulative profiles unique to the responses of the individual user.

The basic method of the invention can be optimized by generating, in realtime or with latency as near to zero as possible, personalized user profiles based on user responses in any content environment. Weighting values can be assigned to profile entries based on a predetermined weighting of keyword vocabulary. Associations to related cues or profile entries can also be implemented with the utilization of fuzzy logic, ultra fast neural nets, and the like. Ideally, the software application resides in a very small operational footprint, and provides real-time or near-zero latency response. Application of this technology also includes potential utilization as an "operational core" component within an embedded processor, or as a component integrated into a larger system hierarchy. The user can be a person, or any identifiable entity or process that engages the affinity engine.

BRIEF DESCRIPTION OF DRAWINGS

FIG. 2 is a chart of an example of a personalized map generated by a series of user request/response interactions in searching a database.

DETAILED DESCRIPTION OF THE INVENTION

Figure 1:
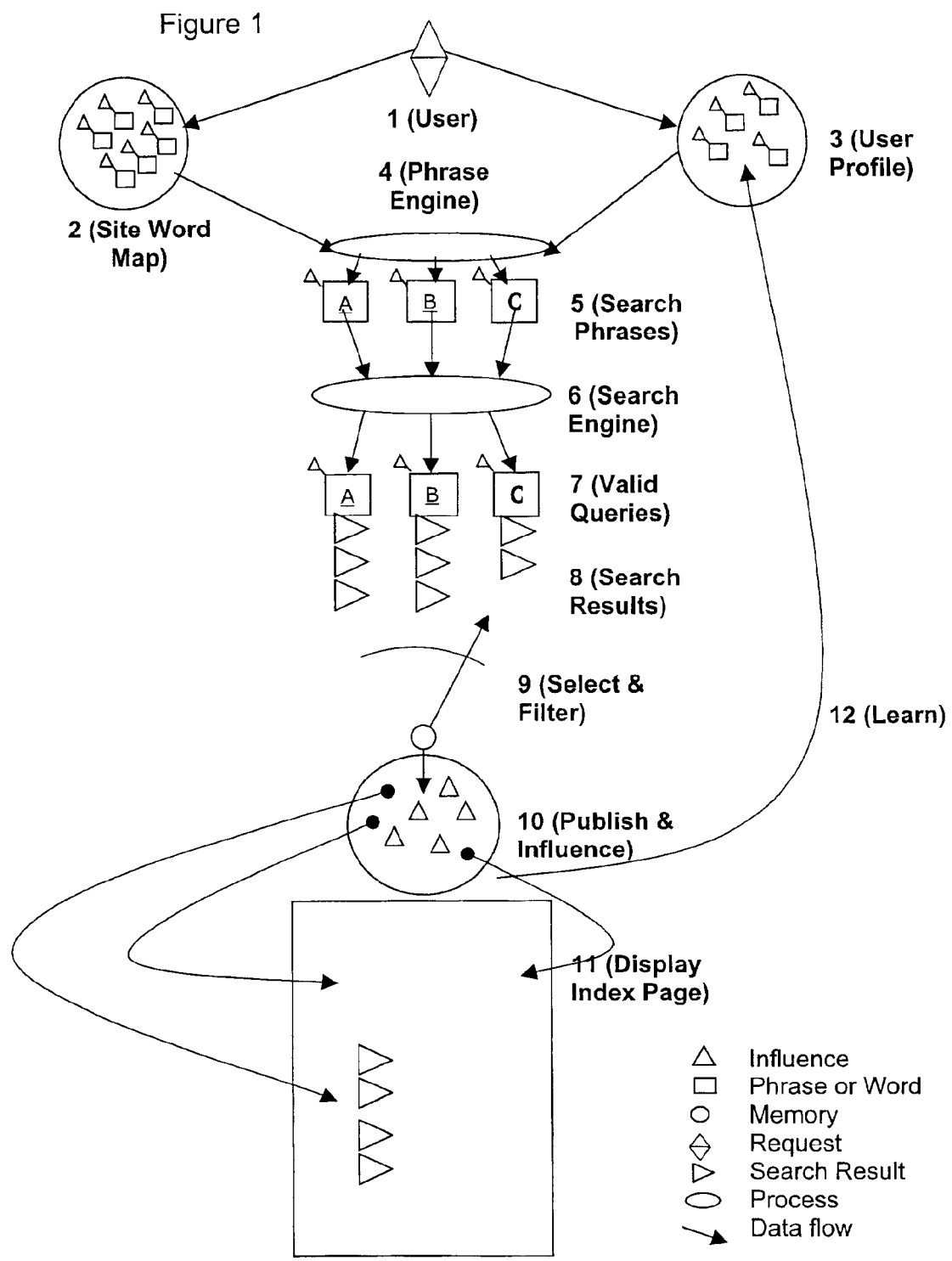
FIG. 1 is a schematic diagram of the component steps of the method of creating personalized user profiles in accordance with the invention.

The method of creating personalized user profiles in the present invention is broadly applicable to any type of large or distributed database of information, computing environment, or mode of user request/response interactions with a database of information. The method is applicable in a generic way to the use of any natural or abstract language, with any definition of user input cues, local or global, and to any type of interface between the user and a digital process that interacts with the database of information. As one concrete example, the following describes an embodiment of the method implemented using keywords or display objects linked to keywords for selections as user input cues, a network environment as the repository of a large or distributed database of information, and a standard browser as the interface between the user on a computer connected to the network environment.

FIG. 1 shows a schematic overview of a user's request/response interactions with a database of information in accordance with the invention. This process is accommodated by a combination of establishing a vocabulary archive in advance on a website or portal visited by the user, which can be as inclusive as an entire language or languages, or limited to any subset or subsets of a language, and the operation of a search (phrasing) engine for searching the website. In the given implementation, the initial vocabulary archive is referred to as the Site Word Map 2. The Site Word Map 2 may be composed, for example, of keywords found in the headers or titles of database objects, text found in pages of information stored on the website, metadata of database objects, or subject specific word lists imported from third party sources. Each keyword is associated with other words which are related keywords, subcategories, or further descriptors for content stored on the website. A phrase, sentence, or name may be entered in the Site Word Map and treated as a unit word or represented by an icon or other display object. The associations between keywords or objects and associated keywords are made manually by experts, or through the use of tools to automate the associative process, including tools that collect information on user interaction, and tools that mine information from the particulars of a database or dataset. This conditional vocabulary archive can also provide relative "influence factors" (explained further below), which in turn can drive or influence the word mapping and sub-mapping iterations in the process.

The Site Navigation Map 2 for the website can be generated from or composed from a Site Word Map (also referenced as numeral "2") typically provided on a website. The Site Navigation Map 2 may be presented as a whole or in part to the user, and may be presented as text words or displayed in the form of graphical elements linked to text words. The entries on the Site Navigation Map 2 are typically displayed to the user as an index of possible choices.

A User Profile 3, in this embodiment a Personal Word Map (also referenced as numeral "3"), is established to capture the user's input in the form of keywords or other entries reflecting the choices selected by the user reflecting the items deemed to be of interest to the user. The Personal Word Map 3 may be established initially by retrieving one previously compiled for the user and stored on the computer, or by retrieving a default (initial) word map. The Personal Word Map profile can be structured to subdivide keywords representing user choices into groupings of words from which other keyword associations are established. The purpose of building the associative word schema in the User Profile is to effectively group and/or weigh the words according to how or in what sequence they were selected by the user, in order to develop a structure or association of words that closely and uniquely represents the interests, and hence the unique identity, of the user. The linguistic lexicon of a language is, in essence, a tool for referencing the unique identities of a given community of users. The structuring of words allows extrapolation of subtle nuances of a user's identity beyond the more mechanical metrics of establishing a personal profile via traditional means.

The interative process of developing and enhancing the user's Personal Word Map commences with an initial user selection of a choice from the Site Navigation Map 2 of a website the user is visiting. The user makes a choice from the displayed index (referenced as numeral "1") such as with a mouse click using the browser interface. Other forms of user input may also be used, including voice activation, touch screen, or email or instant messaging input. The user's choice 1 is linked to keywords archived by the Site Navigation Map 2 to reference the object selected. The keywords for the user's choice are provided to the Personal Word Map 3 and to a Phrase Engine 4 for searching the website database for results corresponding to the user's selection.

In each cycle, the Phrase Engine 4 uses the keywords for the user's choice 1 to create a set of Search Phrases 5 that are then used to search the database(s). Multiple Search Phrases are typically generated to provide a range of responses in order to increase probability that an effective response will be delivered. The Phrase Engine 4 creates the Search Phrases 5 by referencing a combined list of default words and/or keyword associations stored in the Site Word Map 2. The Phrase Engine 4 may be programmed in any manner deemed to provide an effective mix of source words for the Search Phrases. For example, each keyword on the Site Word Map may have other keywords or default words associated with it, and a predetermined number of Search Phrases may be generated by randomly forming word pairs from the associated keywords or default words. The Phrase Engine may also be configured in advance to determine how far along the associative pathways to go. For example, it can be configured to not only include the first level default associations to a word in the Site Word Map, but also second level defaults, i.e., default associations to each of the default words. Search Phrases may also be generated using words sourced from: words in the Personal Word Map; linked associations in the Site Word Map entered in the user's previous click history; words propagated from other users with similar profiles; external word generators; third party applications; user suggested words; and other sources without limitation.

The Phrase Engine is preferably configured to use a specified and finite number of word associations from each user choice. The Search Phrases may contain any number of words, with two-word Search Phrases being the standard configuration. The Search Phrases are preferably non-hierarchical and Boolean, that is WORD 1+WORD 2, in any order of words.

The Search Phrases 5 are next routed to the Search Engine 6 that is configured to generate and send queries, or Valid Phrases 7 in a format accepted by the Site database(s). The Search Engine returns Search Results 8 from the database in response to the queries. The search results may be, for example, text, graphics, media objects, product information, etc., stored in the database. The Search Results may be filtered or limited in accordance with predetermined parameters, indicated by the Select & Filter function 9, such as random selection of a limited number of results per search query, relevancy ranking, etc. A Display 11 is then generated to display the Search Results as a new index of choices to the user. The Display 11 is generated in accordance with predetermined parameters of a Publish & Influence function 10, which can parse the search results, influence the calculation of which search results to accept, and add other content, static elements, ads, etc.

If the user selects an object from the Display 11 of returned search results, then the particular keywords used in the Search Phrase that returned that object are added to the User Profile 3, or, if they are already present in the Profile, they are then reinforced. This is referenced as the Learn function 12 in the technical schema. The returned keywords and associative keywords maintained in the User Profile are then used to create new Search Phrases, thereby repeating the cycle of user request/response interactions with the database. The user can exit the process at any time and store the resulting enhanced Personal Word Map 3.

The individual path created by the updated associations present in the User Profile steers the control cues for content delivery and the organization of the web portal/device display on the next click. The User Profile is shaped dynamically on a continuous basis, preferably in real-time or near real-time (close to zero-latency), as it is updated with each user input. These updates are then immediately available for the next iteration of the process loop. An associative proximity histrionic metaphor is therefore traced throughout the iteration cycles of the process, which is persistent, and so carries an associative referencing schema through the system hierarchy that is uniquely formed by each individual and applied directly for that individual.

Each word entry in the Site Word Map may carry further associations with it, which are here called Influences. Influences are assignments per word, dynamic or fixed, that accumulate in the User Profile, by sum, replacement or immediate action as the words they are attached to are added to the indexed associative list. Influences are items that can have various tags/triggers attached and can be added, combined and processed to control display or profiling variables, and or trigger other processes.

The steps carried out in the basic process can be simplified and represented as follows:

Words or words linked to graphical elements are presented as choices to a user in a display.

Each word is associated with other keywords or default words.

If a profile of the user has previously been established, the profile is referenced for previous added keywords or associative words.

Search phrases are made from selected keywords or associative words from the profile.

The search phrases are sent to search for objects in the database.

The objects returned from the search are presented to the user as a new display of choices.

When a user selects an object, the words that were used to search for that object are entered into that user's profile, or reinforced if already present.

The cycle repeats iteratively.

The User Profile

The User Profile is written in natural language for uniform accessibility. The individually derived trace or portrait present in a User Profile becomes the foundation of interaction for the user with the World Wide Web site or other database information. An example of the building of the Personal Word Map for the User Profile is illustrated in FIG. 2 in five stages. The number in brackets ([ ] ) displays the number of times the word has been utilized in Valid Phrases which returned Search Results which were then clicked upon by the user.

In Stage I, Search Result "a" (or an initial keyword "a" from the Site Navigation Map) is clicked, and is linked to Keywords "1" and "2" (used in the search phrase that returned that result or provided by the Site Word Map). An entry for each Keyword is added to the Personal Word Map, with its complementary Keyword added as an associative word. The Keywords "1" and "2" are then used to generate a Search Phrase "1,2". The Search Phrase returns a number of results which are displayed to the user.

In Stage II, Search Result "b" is clicked by the user. Keywords "3" and "4" used in the search phrase that returned that result are added to the Personal Word Map, with its complementary Keyword added as an associative word. The Keywords "3" and "4" are then used to generate a Search Phrase "3,4".

In Stage III, Search Result "c" is clicked by the user. Keywords "1" and "4" used in the search phrase that returned that result are added to the Personal Word Map. However, since both Keywords are already present in the list, the counter or weight value in brackets is simply incremented by one. The Keywords "1 and "4" are then used to generate a Search Phrase "1,4".

In Stage IV, Search Result "d" is clicked by the user. Keywords "1" and "2" used in the search phrase that returned that result are added or incremented by one. The Keywords "1 and "2" are then used to generate a Search Phrase "1,2". Similarly, in Stage V, Search Result "c" is clicked by the user, and Keywords "1" and "3" which returned that result are added or incremented by one. The Keywords "1 and "3" are then used to generate a Search Phrase "1,3". The resulting Personal Word Map listing a high value for Keyword "1" particularly in association with Keyword "2", and values for Keyword "2" particularly in association with Keyword "1", and for Keyword "3" particularly in association with Keyword "1" represent a potentially unique identifier for this user.

The Personal Word Map may also be configured to display the accumulated user click history, display accumulated user Influences, and display a list of objects which has been shown strong interest in the past by the user (such as products for purchase). The User Profile is configured upon installation of the affinity engine. External data may be incorporated in the User Profile. Examples of the use of external data are as reinforcement weighting for existing Influences, as a vehicle to import new Influences, or as a means to allow external data to affect a Personal Word Map through the importing of additional words.

Keyword Example of the Personal Word Map Building Sequence

The new user browses a Site, and is shown an initial index of words. The words comprise all or part of the Site Navigation Map. Alternatively, the user may be shown an initial set of data objects such as images or icons, each of which is linked to a word in the index of the Site Navigation Map. The user makes an initial selection from the index by clicking on an entry, thereby giving his input cue. In this case the user has clicked on the word SAILBOAT.

The Site Word Map is referenced for the entry SAIL-BOAT. It is found, because all words in the Site Navigation Map are also entries in the Site Word Map. The Site Word Map contains a list of associated words for each word in its index. The words associated with SAILBOAT are listed as:
SAILBOAT: MARINA, SAILING, NAVIGATION, WIND, REPAIR, HULL, OPERATION, TOYBOAT, MODEL, OCEAN, SAILBOAT.
SAILBOAT may also be listed in the index of associated words for SAILBOAT.

The list is sent to the Phrase Engine to generate Search Phrases. In this example, Search Phrases contain two words, each a combination of words from the list which form Boolean phrases that are Valid Phrases such as:
MARINA, NAVIGATION
NAVIGATION, TOYBOAT
MARINA, TOYBOAT
MODEL, TOYBOAT
MODEL, NAVIGATION
REPAIR, MODEL
REPAIR, MARINA
REPAIR, NAVIGATION
REPAIR, TOYBOAT
SAILBOAT, OPERATION
SAILING, OPERATION
SAILBOAT, NAVIGATION The Phrase Engine has been configured in this example to send phrases to the Search Engine, which will generate queries to the database from these phrases. The Phrase Engine in this example has been configured to send five Valid Phrases, and the selection of these five phrases is done by random selection from the Valid Phrases. The list sent after random selection is then:
MARINA, NAVIGATION
MODEL, TOYBOAT
SAILBOAT, NAVIGATION
REPAIR, MODEL
SAILING, OPERATION Search Results from the database search queries are published to the user. The number of Search Results to publish to the user is determined in advance by preset publishing parameters of the Site which decide what the published page should look like, and which are stored in Publish and Influence. If the database returns are greater than the configuration calls for, then a random selected group from the returns is published, or a group would be chosen by specified criteria. So, for example, if the five Valid Phrases return 1000 database entries, and the configuration is set to publish only 15 in a web page publishing template, then 15 are chosen at random from the 100 returns, or several Search Results from each of the five Valid Phrases may be chosen at random until 15 are reached, or 15 chosen by other specified criteria.

Once the user sees the Search Results published to the Display, if he does not select any of the Search Results, which in this example are Products, no entry to the Personal Word Map will be made. In this example, however, the user chooses a Product that was found by the query generated by the Search Phrase MODEL, TOYBOAT. Both words in the phrase have equal weight, and have been so an entry is made in the Personal Word Map:
TOYBOAT[1]: MODEL[1]
MODEL[1]: TOYBOAT[1]

If the user does not select any Products from this set, but instead selects a new word from the Site Navigation Map, the process begins again. If, however, the user selects another Product on the page by clicking on it, this time a Product that was returned by a query that contains REPAIR, MODEL, then next entry will then be made, and the Personal Word Map will read as follows:
TOYBOAT [1]: MODEL [1]
MODEL[2]: TOYBOAT[1], REPAIR [1]
REPAIR [1]: MODEL [1]

The user next returns to the Display of the Site Navigation Map, and clicks on the word MODEL. The indexed words associated with MODEL in the Site Word Map are listed as follows:
MODEL: CRAFTS, SUPPLIES, BUILD, WOODEN, PLASTIC, PAPER, BOAT, PLANE, ADHESIVE, MAGAZINE, MODEL The Phrase Engine references the User Profile. In this case, since the user selected MODEL, and MODEL is already indexed in the Personal Word Map, the Phrase Engine is configured to select a number of the words associated with MODEL to combine with the list of default associated words that will be used to generate Search Phrases. In this example, the Phrase Engine has been configured to add five of these associated words with the highest weighting. If there are not five associations to MODEL in the Personal Word Map, it is configured to randomly select other indexed words in the Personal Word Map, beginning with the highest weighted words, and then selecting randomly amongst the remaining indexed words. Since only two words are currently indexed in the Personal Word Map that are not already in the list of words associated with MODEL, and these are TOYBOAT, REPAIR, these are added, and the Search Phrase list contains:

CRAFTS, SUPPLIES, BUILD, WOODEN, PLASTIC, PAPER, BOAT, PLANE, ADHESIVE, MAGAZINE, MODEL, TOYBOAT, REPAIR

Search Phrases in Boolean combinations of two words each are then generated and then five Valid Phrases are randomly selected and configured by the Search Engine:

WOODEN, SUPPLIES
CRAFTS, PAPER
BOAT, ADHESIVE
MAGAZINE, CRAFRS
MODEL, SUPPLIES

The Search Engine sends database queries; in this example, 150 Search Results are sent back. The publishing parameters in Publish and Influence have been configured to randomly select 15 of the returns and publish them in a Display to the user. The user clicks on a Product that has been returned by the query containing the Valid Phrase WOODEN, SUPPLIES. The Personal Word Map is then updated by inclusion of these 2 words, and since neither of the words is already indexed, the Personal Word Map is updated to read:

TOYBOAT[1]: MODEL[1]
MODEL[2]: TOYBOAT[1], REPAIR [1]
REPAIR[1]: MODEL[1]
WOODEN[1]: SUPPLIES[1]
SUPPLIES[1]: WOODEN[1]

When the user next selects another Product from the same published page that was returned by the Valid Phrase MODEL, SUPPLIES, since these are already in the index, the Personal Word Map is incrementally updated to read:

TOYBOAT[1]: MODEL[1]
MODEL[3]: TOYBOAT[1], REPAIR [1], SUPPLIES[1]
REPAIR[1]: MODEL[1]
WOODEN[1]: SUPPLIES[1]
SUPPLIES[2]: WOODEN[1], MODEL[1]

A third Product selection from the same published page that was returned by the Valid Phrase BOAT, ADHESIVE causes the incremental update of the Personal Word Map to read as follows:

TOYBOAT[1]: MODEL[1]
MODEL[3]: TOYBOAT[1], REPAIR [1], SUPPLIES[1]
REPAIR[1]: MODEL[1]
WOODEN[1]: SUPPLIES[1]
SUPPLIES[2]: WOODEN[1], MODEL[1]
BOAT[1]: ADHESIVE[1]
ADHESIVE[1]: BOAT[1]

The user next returns to the Display of the Site Navigation Map, and clicks on the word VACATION. The indexed words associated with VACATION in the Site Word Map are listed as follows:

VACATION: TRAVEL, ACTIVITIES, DESTINATIONS, BEACHES, MOUNTAINS, LAKES, RESERVATIONS, TRANSPORTATION, HOTELS, VACATION

The User Profile is referenced by the Phrase Engine, which has been configured to take two words from the Personal Word Map with the highest weighting, and a total of four of the highest weighted words associated those two words, and include the total of six words in pool of words from which to generate Search Phrases. MODEL[3], and SUPPLIES[2] are added since these are weighted highest, and then indexed words associated with these highest weighted are picked by the Phrase Engine; adding WOODEN, TOYBOAT, REPAIR. Since the configuration specifies that six words from the Personal Word Map be sent to the Phrase Engine, and all the remaining words indexed therein have a weighting of [1], a random selection is made of BOAT. The pool of words available to the Phrase Engine now reads:

VACATION: TRAVEL, ACTIVITIES, DESTINATIONS, BEACHES, MOUNTAINS, LAKES, RESERVATIONS, TRANSPORTATION, HOTELS, VACATION, MODEL, SUPPLIES, BOAT, WOODEN, TOYBOAT, REPAIR.

Valid Phrases are randomly selected from Boolean combinations, five as per the current configuration and are sent to the Search Engine as follows:

LAKES, BOAT
TRANSPORTATION, RESERVATIONS
HOTELS, RESERVATIONS
BEACHES, LAKES
MOUNTAINS, ACTIVITES

The user views the next published page at the Display of 15 randomly selected Products of the 200 database Search Results, but does not see a Product he wants to click on. In this example, the Site configuration allows the user to ask for more Search Results, by clicking on a button or other graphical element with the word "More." This Site has been configured to select 15 database returns from the 200 Search Results at random again, when the user indicates this preference by clicking on "More." The user now selects a Product from the next published page that was returned by the Valid Phrase LAKES, BOAT; since BOAT is already there it is incrementally updated with a higher weight, however, since LAKE is not already there, it is added.

TOYBOAT[1]: MODEL[1]
MODEL[3]: TOYBOAT [1], REPAIR [1], SUPPLIES[1]
REPAIR[1]: MODEL[1]
WOODEN[1]: SUPPLIES[1]
SUPPLIES[2]: WOODEN[1], MODEL[1]
BOAT[2]: ADHESIVE[1], LAKES[1]
ADHESIVE[1]: BOAT[1]
LAKES[1], BOAT[1]

The user also clicks on the database return generated by the Valid Phrase LAKES, OCEAN, causing the User Profile to be additionally updated with an increment to the word LAKES and the additional word OCEAN to read:

TOYBOAT[1]: MODEL[1]
MODEL[3]: TOYBOAT [1], REPAIR [1], SUPPLIES[1]
REPAIR[1]: MODEL[1]
WOODEN[1]: SUPPLIES[1]
SUPPLIES[2]: WOODEN[1], MODEL[1]
BOAT[2]: ADHESIVE[1], LAKES[1]
ADHESIVE[1]: BOAT[1]
LAKES[2]: BOAT[1], OCEAN[1]
OCEAN[1]: LAKES[1]

Influences may have also been attached to certain words present in the Site Word Map. In this example, an Influence has been attached to the word WATER, and to all default associations to the word WATER indexed in the Site Word Map. The default associations to WATER indexed in the Site Word Map, in this example, reads:

WATER: OCEAN, LAKES, RIVERS, STREAMS, DRINKING, BLUE, AQUA, RAIN, LIFE, ACTIVITIES, BOAT, H2O, FLOW, WATER

The example INFLUENCE is a trigger that states:
TURN THE HTML PAGE BODY BACKGROUND OF THE PAGE NEXT DISPLAYED TO THE COLOR BLUE WHEN THE USER PROFILE CONTAINS ANY DEFAULT ASSOCIATIONS TO WATER, WHICH HAVE ACCUMULATED COMBINED WEIGHTING AMONG THE ASSOCIATIONS OF 5 INCREMENTS OR GREATER.

Since the Personal Word Map now contains the following data:
LAKES[2]: BOAT[2], OCEAN[1],
BOAT[2]: ADHESIVE[1], LAKE[1]
and since LAKES, BOAT, and OCEAN are default associations to WATER that are combined to total 5 increments or greater, Publish and Influence performs the calculation and returns a Display with the html page body background BLUE.

From the BLUE page at the Display, the user next clicks on a Search Result returned by a database query containing the Valid Phrase HOTELS, RESERVATIONS. The Personal Word Map is incrementally updated to read:
TOYBOAT[1]: MODEL[1]
MODEL[3]: TOYBOAT [1], REPAIR [1], SUPPLIES[1]
REPAIR [1]: MODEL[1]
WOODEN[1]: SUPPLIES[1]
SUPPLIES[2]: WOODEN[1], MODEL[1]
BOAT[2]: ADHESIVE[1], LAKES[1]
ADHESIVE[1]: BOAT[1]
LAKES[2]: BOAT[1], OCEAN[1]
OCEAN[1]: LAKES[1]
HOTELS[1]: RESERVATIONS[1]
RESERVATIONS[1]: HOTELS[1]

An Influence is attached to the word HOTEL in this example that states:
WHEN HOTEL IS MADE AS AN ENTRY TO A PERSONAL WORD MAP WHICH ALSO CONTAINS DEFAULT ASSOCIATIONS TO WATER, WHICH HAVE ACCUMULATED COMBINED WEIGHTING AMONG THE ASSOCIATIONS OF 5 INCREMENTS OR GREATER, INFORM PUBLISH AND INFLUENCE TO INCLUDE AN ADVERTISEMENT FOR VACATION PACKAGES THAT FEATURE WATER SPORTS AT THE NEXT DISPLAY.

At the next Display, the user discontinues the browsing session. The User Profile for that user is stored in this example; a unique User ID has been generated and stored with the User Profile, and the Site has deposited, and made note of a browser cookie for the user.

When the user initiates a new browsing session and returns to the Site, he is recognized via the browser cookie, or via user login to the Site. The User Profile for the user is then accessed. The Phrase Engine in this example has been configured to resume the session, by displaying Search Results retrieved by queries containing Valid Phrases that were made and saved from the first session. Alternatively, the Phrase Engine may be configured to delay referencing the User Profile and the Personal Word Maps until the user has a specified number of clicks have been made by in the new session, or until other conditions have been met as specified.

Computing Environment

A prototype application of the invention was written in JAVA and successfully operated on JAVA Servlet Architecture. However, certainly other implementations could be written in other programming languages such as C or C++ if needed. The application is able to operate on many different hardware and operating system computing platforms, and it can be operated independently of any particular third party application. It is optimally effective as an Internet server application, although it can run in its entirety on one computer processor that is also holding the database.

The software application can interface to a variety of external search engines and databases, and can make use of a variety of Phrase Engine configurations that can be adjusted or tuned to the various databases simultaneously. This feature that enables user input to be consistently accommodated by a single set of words in the Site Word Map, and word mapping for understanding by a the various databases accomplishes a type of machine translation on the query side. Automated data integration is accomplished as the returns from the various databases are then published for the user. The application additionally performs integration of data via the User Profile, which can accept input from third party data sources through an Application Interface (API).

The User Profile may also be stored on the Internet user's home machine, rather than on an Internet server. The User Profile can thus be made available for use by any Internet web site. Such a site would subscribe to the Dynamic Personalization API or data format and make use of the data, as it is able. Allowing the user access to the User Profile, whether it is kept on the user's machine or on any server enables the web site to offer editing or other means of control by the user over his User Profile.

Commercial Applications

The immediate applicability of the user profile creating application is at the transaction layer of web portals. This latter category is, of course, of extreme interest to those enterprises that rely specifically on revenue streams derived directly from transactions implemented on the Internet, particularly in the arenas of web personalization for the purpose of pro-actively driven sales of products and services, and also in the industry sector of CRM (Customer Relations Management) in the interest of understanding consumer needs. In this context, the user profile creating application, as a transactional process layer embedded into a web portal's design architecture and contiguous operation, provides both enhanced intuitive interaction for the user, and anticipatory, adaptive intelligence resources for the business client.

Other means for achieving the goal of fine-grained personalization were considered, such as creating demographic categories of users. The creation of categories, however, limits the resolution of the understanding of the users, since the creation of categories carries a built-in prejudice provided by the creators of the categories, and as it appears to us, any predeterminations made, bias the outcome to the creator's expectation. The application as disclosed carries the nearly infinite capacity for resolution represented by the differences in word indexes that can be found in the Personal Word Maps. It is only by allowing the user to determine what the system means to them that a reliable indicator is achieved. Words in a vocabulary archive are by their nature defined by communities, are used everywhere, and contain so many elements and varieties that an averaging of influential elements is achieved.

The fact that vocabulary archives also can change over time and differ from region to region works to advantage in this system, since the system can adapt to those variations easily via changes to the Site Word Map, the Site Navigation Map, the Influences, and the Site configuration. In fact, as a means to service the different current states of the various users and to accommodate the limits and variations of data exchanges, the Site Navigation Map and Site Word Map can be continuously evolving. This adaptive capability anticipates the evolution of the meaning of words in a constantly changing cultural context. This feature enables the user profiling application to establish demographic definitions based on cultural subsets and language dialects. Information resulting from those changes is available very quickly in a readable form both to the user and to the site operator each time the Site is accessed.

The process disclosed uses a workable natural language based application without having to deal with syntax, grammar and the other more difficult aspects of language. As a vocabulary archive, the Site Word Map and Site Navigation Map establish a commonality of language for use throughout the system, which serves as a registration point for a diverse set of secondary usages, including business intelligence applications that mine and extract demographic definition by dialect or cultural sub-group, cross language definitions, and amalgam understanding of the total user base.

In the area of behavioral demographics data extraction, or the intuitive management of combinatorial online resources using a collaborative interface, the user profiling method is well suited. Since the application uses regular words to function and to remember, in the form of an individual profile, the cultural linguistics of each user, demographic extraction becomes an extremely fine-grained metric. Typically a database in today's marketing world has 8–16 demographic definitions. Now that more powerful machines are coming on line up to several hundred demographic categories are sometimes seen. With a typical database structure, adding a demographic definition directly affects performance measured in response time. The user profiling method allows for an actual and "able to be applied" demographic group of one definition per user or multiple millions with out affecting performance. The similarities and functional aspects of the individual demographic definitions can easily be applied or associated with others in the group creating self-defining micro-demographic pathways or groups. Traditional demographic understanding can be extracted and applied within this process by defining groups of users using words, thereby creating a built in transition to legacy systems of consumer data, and a migration of capability to this system and beyond. For example, the traditional demographic understanding may supply the information that people who like to skateboard are males, ages 10 to 24. The advantage is that the data extraction may reveal this traditional demographic group contains subgroups, such as a subgroup that likes skateboarding, cartoons, and comic books, and a subgroup that likes skateboarding, caps, music, and college textbooks.

The economic structure of commerce on the Internet now includes corporations functioning in multi-lingual environments. The user profiling method has the ability to define words in a local context on an individual basis. This includes the ability to work in foreign and even multiple languages including symbolic languages. The data access and publishing can take place in one language while the business intelligence can take place in another.

The potential for utilizing additional core Artificial Intelligence engine modules with the appropriate parsing engine and related interfacing/translation tools yields an opportunity for discovering emergent behaviors and activity patterns driven specifically by natural language semantic interactions. Given a range and diversity of user populations, core subject themes, and the ability to extrapolate subtle cultural and psychodynamic nuances inherent within the linguistic lexicon, a series of vocabulary training templates can be established.

A training template need not be a rigid parameter set, with an absolute match requirement to satisfy a logical "yes" value when an exact word, name, or other identifier tag is found, but rather an approximate value that represents an inferred similar value, as represented by the contextual associations in the User Profile. The relative proximity value itself can be a dynamically modifiable feature set, so that a consecutively broader affinity context can be established. The ability of the application to adapt to a range of word usage on an individual basis enables use of the User Profile as a character profile to serve as an interface to virtual beings, for example to provide the context to determine a preferred response by a virtual being out of a group of possible responses.

Privacy on the Internet is an ongoing concern. The user profiling method does not require that the user be known, and allows adaptation to the user anonymously, without requirement for the user to fill out an information form or matching to any other know aspect of that individual. By accumulating a database of personal profiles, and querying the aggregate of those profiles for information, extensive applications are immediately possible in the form of trend analysis and long-term portrayal of a society. Some examples would be:

Cultural Pattern Recognition

Geographic Trend Analysis

Demographic Visualization

Behavioral Characterization of Markets

Language and Culture Migration

A diverse range of applications will further be appropriate, specifically in the arena of embedded processor elements in wireless communications devices, interactive media appliances, unified process management systems, and integrated into next generation smart card and wireless devices. Additional future uses include:

Interfacing the user profiling method to a digital entity, intelligent agent or bot. This would allow an entity speaking an unknown language or protocol to auto-define meaning in a dynamic context.

Using the user profiling method to define and operate executables.

Using the user profiling method to function as an interactive learning iterative loop to string sequences of executables defined by the user language and interaction.

What is claimed is:

1. A method of creating a personalized user profile implemented on a computer for searching a database comprising:

(a) displaying to the user an index of choices representing content items stored in the database, wherein each choice of the index is associated with a set of related keywords representing categories for the content items stored in the database;

(b) establishing a personal profile for the user comprising a Personal Word Map of keywords compiled from selections made by the user from the displayed index and from those entered as user input on the computer;

(c) receiving a first user input of a selection of a choice from the displayed index, and retrieving the associated keywords related to the selected choice, and selecting one or more pairs of different keywords as Boolean operators in order to generate a corresponding set of one or more search phrases using the associated keywords;

(d) conducting a search of the database using the set of search phrases as search queries to the database, and returning one or more objects from the database in response to the search queries;

(e) displaying to the user a new index of choices representing the objects returned from the database, wherein each choice on the displayed index is associated with the pair of keywords used as Boolean operators in the search phrase that returned the object represented;

(f) receiving a subsequent user input of a selection of a choice from the displayed index, and updating the Personal Word Map of the user's personal profile with the pair of keywords used in the search phrase that returned the selected object, wherein said Personal Word Map is comprised of senarate line entries for each different keyword used in a search phrase followed by its associated keyword, and each keyword in the Personalized Word Map is tracked with a weight value for the number of times that keyword has been used in search phrases that returned objects selected by the user;

(g) retrieving associated keywords related to each of the pair of keywords used in the search phrase that returned the selected object, and selecting one or more pairs of different keywords from the associated keywords as Boolean operators in order to generate a subsequent set of search phrases using the associated keywords;

(h) conducting a subsequent search of the database using the subsequent set of search phrases as further search queries to the database, and returning one or more objects from the database in response to the search queries;

(i) displaying to the user a new index of choices representing the objects returned from the database, wherein each choice on the displayed index is associated with the pair of keywords used in the search phrase that returned the object represented; and (j) for each user selection of a choice from the displayed index, updating the Personal Word Map of the user's personal profile by entering each keyword of each pair of keywords for a user selection as a separate line entry if it is not already listed as a separate line entry, or if it is already listed as a separate line entry then incrementing the weight value of the listed keyword by one, and also entering its associated keyword as a following entry if it is not already listed as a following entry, and if the associated keyword is already listed as a following entry then incrementing its weight value by one;

whereby, by iteratively continuing the cycle of user input by selection from the displayed index of choices, updating the user's personal profile with keywords used in the search phrase that returned the object selected by the user, using associated keywords related to the selected keywords to generate a subsequent set of search phrases, and conducting a further search of the database with the subsequent set of search phrases, the depth of the personal profile is continuously refined by user selections over time adding to the weight value of keywords and those associated therewith for objects selected by the user and allowing it to be used to uniquely characterize the particular interests of the user in computerized applications that are to be personalized to the user.

2. A method according to claim 1, wherein the method is implemented on a computer connected to a network, and the network is a repository of a large or distributed database of information.

3. A method according to claim 2, wherein the network is the World Wide Web having multitude of websites storing a distributed database of information, and the user uses a standard browser as an interface on the computer to the World Wide Web.

4. A method according to claim 3, wherein to initiate a session by the user to visit a web site on the World Wide Web, a Site Navigation Map containing choices of objects representing categories of content items stored on the website is displayed as an initial index to the user.

5. A method according to claim 4 wherein the Site Navigation Map is included in a Site Word Map containing lists of default keywords associated with each choice displayed to the user.

6. A method according to claim 1, wherein to initiate a session on the computer by the user, a previous Personalized Word Map stored on the computer is retrieved, or, if there is no stored personal word map, a default (initial) word map is retrieved.

7. A method according to claim 1, further comprising prior to displaying a new index of objects returned from search queries to the database, the step of selecting and filtering objects to be included in the display according to pre-determined parameters.

8. A method according to claim 7, further comprising the step of publishing and influencing the selection of objects to be presented in the display according to predetermined parameters.

9. A method according to claim 8, wherein the step of influencing the selection of objects to be presented in the display includes selecting those objects whose search phrases include a keyword that matches a keyword already listed on the Personalized Word Map.

10. A method according to claim 4, wherein the personal profile for the user is used to identify the user's preferences for items of interest on a website visited by the user.

11. A method according to claim 10, wherein the personal profile for the user is used at the transaction layer of a website.

12. A method according to claim 10, wherein the personal profile for the user is used to display items retrieved from the database of the website that match the preferences of the user.

13. A method according to claim 1, wherein the personal profile for the user is used for a database application involving one of the group consisting of: Cultural Pattern Recognition; Geographic Trend Analysis; Demographic Visualization; Behavioral Characterization of Markets; and Language and Culture Migration.

* * * * *